US012600139B2

(12) United States Patent
Bridges et al.

(10) Patent No.: US 12,600,139 B2
(45) Date of Patent: Apr. 14, 2026

(54) WASH VALVE

(71) Applicant: DOMINO UK LIMITED, Cambridge (GB)

(72) Inventors: Richard Thomas Calhoun Bridges, Cambridge (GB); Justin Chase, Cambridge (GB); Antonio Jesús Martín Arrabal, Cambridge (GB); Stuart Mark Walkington, Cambridge (GB)

(73) Assignee: Domino UK Limited (GB)

( * ) Notice: Subject to any disclaimer, the term of this patent is extended or adjusted under 35 U.S.C. 154(b) by 137 days.

(21) Appl. No.: 18/557,501

(22) PCT Filed: Apr. 27, 2022

(86) PCT No.: PCT/EP2022/061281
§ 371 (c)(1),
(2) Date: Oct. 26, 2023

(87) PCT Pub. No.: WO2022/229296
PCT Pub. Date: Nov. 3, 2022

(65) Prior Publication Data

US 2024/0217239 A1 Jul. 4, 2024

(30) Foreign Application Priority Data

Apr. 27, 2021 (GB) ..................................... 2105982

(51) Int. Cl.

| | |
|---|---|
| ***B41J 2/17*** | (2006.01) |
| ***B41J 2/165*** | (2006.01) |
| ***B41J 2/175*** | (2006.01) |

(52) U.S. Cl.
CPC ......... *B41J 2/1707* (2013.01); *B41J 2/16552* (2013.01); *B41J 2/17596* (2013.01)

(58) Field of Classification Search
CPC ...... B51J 2/16552; B41J 2/1707; B41J 2/175; B41J 2/17596
See application file for complete search history.

(56) References Cited

U.S. PATENT DOCUMENTS 4,121,222 A * 10/1978 Diebold .................. B41J 2/175 347/7
4,555,712 A * 11/1985 Arway ..................... B41J 2/195 347/7
(Continued)

*Primary Examiner* — Anh T Vo
(74) *Attorney, Agent, or Firm* — Bochner PLLC; Andrew D. Bochner

(57) ABSTRACT

A continuous inkjet printer 2 has a drop generator 16, an ink source 7, an ink feed line 17 delivering ink from the ink source 7 to the drop generator 16, a solvent source 8, a solvent feed line 35 delivering solvent from the solvent source 8 to the drop generator 16, a flush valve 37 controlling a flow of solvent through the solvent feed line 35, a source of negative pressure 24, a wash valve 40 connecting the ink feed line 17 to the source of negative pressure 24, and a controller controlling the valves 37, 40, the solvent feed line 35 and the ink feed line 17 forming a junction where ink and solvent meet at an interface, and the controller, when shutting down the printer 2, controls the wash valve 40 and flush valve 37 to draw solvent into the ink feed line 17 from the solvent feed line 35 to draw the interface along the ink feed line 17 away from the drop generator 16.

15 Claims, 2 Drawing Sheets

(56) References Cited

U.S. PATENT DOCUMENTS

| | | | | | |
|---|---|---|---|---|---|
| 5,126,752 | A * | 6/1992 | Weinberg | B41J 2/1707 347/73 |
| 6,145,954 | A * | 11/2000 | Moore | B41J 2/1707 347/28 |
| 6,869,160 | B2 * | 3/2005 | West | B41J 2/1707 347/28 |
| 2005/0093916 | A1 * | 5/2005 | West | B41J 2/1707 347/28 |
| 2010/0097417 | A1 * | 4/2010 | Hill | B41J 2/175 347/73 |

* cited by examiner

| | 19 | 30 | 40 | 33 | 37 |
|---|---|---|---|---|---|
| 1 | 1 | 1 | 0 | 0 | 0 |
| 2 | 0 | 0 | 0 | 1 | 0 |
| 3 | 0 | 0 | 1 | 1 | 1 |
| 4 | 0 | 1 | 0 | 1 | 1 |
| 5 | 1 | 0 | 1 | 0 | 0 |
| 6 | 1 | 0 | 0 | 1 | 0 |
| 7 | 1 | 0 | 0 | 0 | 0 |
| 8 | 0 | 1 | 1 | 1 | 0 |
| 9 | 0 | 0 | 0 | 0 | 0 |

Fig. 2

WASH VALVE

FIELD OF THE INVENTION

This invention relates to continuous inkjet (CIJ) printers and to methods of controlling the operation of CIJ printers.

BACKGROUND TO THE INVENTION

A CIJ printer typically comprises a printer body and a print head. The printer body contains ink and solvent sources, and an ink system including a controller. The print head includes a drop generator and a gutter for receiving ink drops from the drop generator that are not used for printing. The drop generator is connected to the ink and solvent sources and ink system by ink and solvent feed lines and electrical signal and power lines. The gutter is connected to the ink source by a gutter line. The ink and solvent feed, electrical and gutter lines form a so-called "umbilical" that connects the print head to the printer body.

For reliable operation of a CIJ printer, the ink system, and in particular the drop generator, must be cleaned as part of a shutdown sequence of the printer, to ensure that ink does not dry in the drop generator. Typically, the solvent that is used to reduce the viscosity of the ink is used to clean the ink system.

EP 0 908 316 discloses a CIJ printer that draws solvent into a bleed line through a print head, then uses a valve to connect an ink feed line to the bleed line to use a resulting flow of ink into the bleed line to force the solvent in the bleed line through a nozzle of the print head to clean the nozzle. It refers to GB 2 236 712, which is concerned with introducing solvent into an ink feed line normally used for feeding ink to a drop generator, then using a flow of ink through the ink feed line to force the solvent introduced into the ink feed line through a nozzle of the drop generator to clean the nozzle. It is worth noting that GB 2 236 712 emphasises, e.g., in its abstract, that when the printer is to be closed down, the nozzle is left filled with solvent.

WO 2006/067227 is concerned with preventing solvent from being jetted from a nozzle of a drop generator while solvent flows through the drop generator to clean it. A vacuum source used to draw ink through a gutter line of the drop generator is used to draw solvent out of the drop generator into a bleed line.

SUMMARY OF THE INVENTION

According to a first aspect of the invention there is provided a continuous inkjet (CIJ) printer that has a drop generator, an ink source, an ink feed line configured to deliver ink from the ink source to the drop generator, a solvent source, a solvent feed line configured to deliver solvent from the solvent source to the drop generator, a flush valve operable to control a flow of solvent through the solvent feed line, a source of negative pressure, a wash valve operable to connect the ink feed line to the source of negative pressure, and a controller operable to control the valves, the solvent feed line and the ink feed line forming a junction such that, in use of the printer, ink and solvent meet at an interface, wherein the controller is operable, when carrying out a shutdown sequence of the printer, to control the wash valve and flush valve to cause solvent to be drawn into the ink feed line from the solvent feed line to draw the interface along the ink feed line away from the drop generator.

The invention ensures that solvent flowing from the solvent feed line through the drop generator to clean the drop generator is not contaminated with ink from the ink feed line, because when the interface is drawn along the ink feed line away from the drop generator, the ink feed line contains only solvent at the point where the solvent feed line and the ink feed line are joined.

Preferably the solvent feed line is provided with an anti-mixing loop adjacent to the junction of the solvent feed line and the ink feed line.

Where the CIJ printer is provided with the anti-mixing loop, the printer may advantageously have an ink feed valve operable to control a flow of ink through the ink feed line, and the controller may advantageously be operable to control the ink feed valve and the flush valve to cause ink to flow into the solvent feed line to displace the interface along the solvent feed line between the anti-mixing loop and the flush valve.

Preferably the controller is operable to so control the ink feed valve and the flush valve when carrying out a startup sequence of the printer.

Displacing the interface along the solvent feed line between the anti-mixing loop and the flush valve ensures that during operation of the printer, no solvent can enter the drop generator from the solvent feed line. (Solvent entering the drop generator from the solvent feed line might prevent the printer from phasing, i.e., synchronising the formation and charging of ink drops, or reduce the viscosity of the ink, which would affect the trajectories of the ink drops.)

According to a second aspect of the invention there is provided a continuous inkjet (CIJ) printer that has a drop generator, an ink source, an ink feed line configured to deliver ink from the ink source to the drop generator, an ink feed valve operable to control a flow of ink through the ink feed line, a negative pressure source, a bleed line configured to deliver ink and/or solvent from the drop generator to the negative pressure source, and a wash valve operable to connect the ink feed line and the bleed line, wherein the wash valve is connected to the ink feed line between the ink feed valve and the drop generator.

The invention enables ink and/or solvent to be removed from a portion of the drop generator between the bleed line and the ink feed line.

Preferably, the CIJ printer includes a print head valve operable to control a flow of ink from the ink feed line into the drop generator. Preferably the print head valve is connected to the ink feed line between the connection to the wash valve and the drop generator.

The inventors have observed that, even where a CIJ printer includes such a print head valve, if solvent and/or ink remains in the drop generator and ink feed line between the bleed line and the print head valve when the printer is shut down, expansion of the ink and/or solvent due to temperature changes in the environment of the printer can cause the ink and/or solvent to drip from a nozzle of the drop generator.

The CIJ printer may advantageously further comprise a bleed valve operable to control a flow of ink and/or solvent in the bleed line and a controller operable to control the bleed valve and to repeatedly open and close the bleed valve when at least one of solvent and ink is present in the bleed line.

The inventors have found that repeatedly opening and closing the bleed valve helps to draw the solvent and/or ink along the bleed line. This is believed to be because the negative pressure source causes the solvent in the bleed line to vaporise, and briefly closing the bleed valve causes the solvent vapour between the bleed valve and the drop generator to condense, and the condensed vapour briefly to move towards the negative pressure source when the bleed valve is opened before it vaporises again.

According to a third aspect of the invention there is provided a method of controlling the operation of a continuous inkjet (CIJ) printer that has a drop generator, an ink source, an ink feed line configured to deliver ink from the ink source to the drop generator, a solvent source, a solvent feed line configured to deliver solvent from the solvent source to the drop generator, a flush valve operable to control a flow of solvent through the solvent feed line, a source of negative pressure, and a wash valve operable to connect the ink feed line to the source of negative pressure, the solvent feed line and the ink feed line forming a junction such that, in use of the printer, ink and solvent meet at an interface, the method comprising, when carrying out a shutdown sequence of the printer, opening the wash valve and flush valve to cause solvent to be drawn into the ink feed line from the solvent feed line to draw the interface along the ink feed line away from the drop generator.

The solvent feed line may advantageously be provided with an anti-mixing loop adjacent to the junction of the solvent feed line and the ink feed line. The ink feed line may advantageously be provided with an ink feed valve operable to control a flow of ink through the ink feed line.

Where the solvent feed line of the CIJ printer is provided with the anti-mixing loop and the ink feed line is provided with the ink feed valve, the method may advantageously further comprise controlling the ink feed valve and the flush valve to cause ink to flow into the solvent feed line to displace the interface along the solvent feed line between the anti-mixing loop and the flush valve.

According to a fourth aspect of the invention there is provided a method of controlling the operation of a continuous inkjet (CIJ) printer that has a drop generator, an ink source, an ink feed line configured to deliver ink from the ink source to the drop generator, an ink feed valve operable to control a flow of ink through the ink feed line, a negative pressure source, a bleed line configured to deliver ink and/or solvent from the drop generator to the negative pressure source, and a wash valve operable to connect the ink feed line and the bleed line, wherein the wash valve is connected to the ink feed line between the ink feed valve and the drop generator, the method comprising opening the wash valve to cause ink and/or solvent to be drawn from the drop generator into the ink feed line.

The CIJ printer may advantageously include a print head valve operable to control a flow of ink from the ink feed line into the drop generator.

Where the CIJ printer includes the print head valve, the method may advantageously further comprise opening the print head valve to cause ink to be drawn from the drop generator and that portion of the ink feed line between the bleed line and the print head valve into the bleed line and/or that portion of the ink feed line between the print head valve and the wash valve.

The CIJ printer may advantageously include a bleed valve operable to control a flow of ink and/or solvent in the bleed line. Where the CIJ printer includes the bleed valve, the method may advantageously further comprise repeatedly opening and closing the bleed valve when at least one of solvent and ink is present in the bleed line.

BRIEF DESCRIPTION OF THE DRAWINGS

The invention will now be described, by way of example, with reference to the attached drawing figures, in which:

FIG. 2 is a table of valve states during a shutdown sequence of the CIJ printer of FIG. 1.

DETAILED DESCRIPTION OF AN EMBODIMENT

Figure 1:
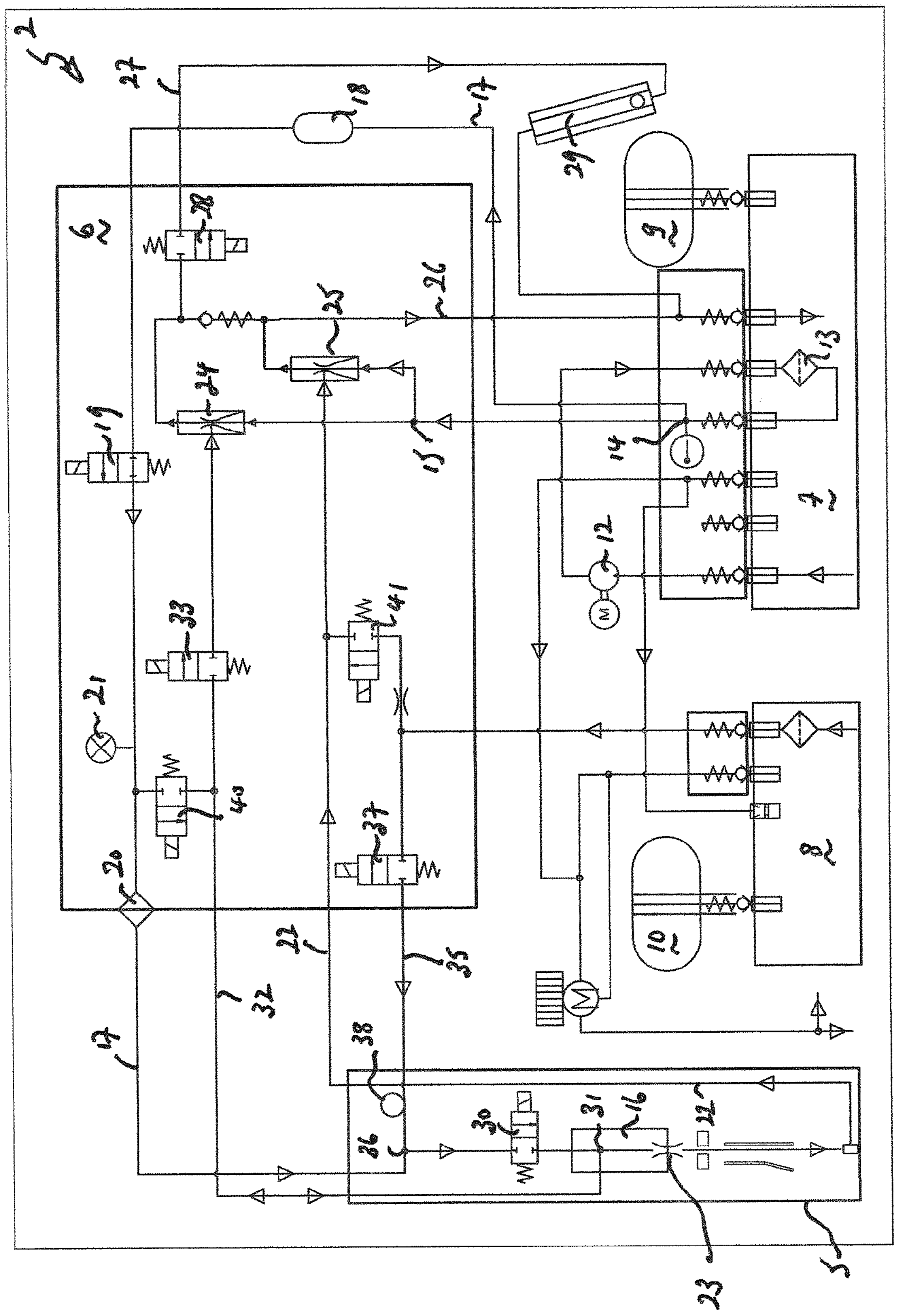
FIG. 1 is a schematic diagram of a CIJ printer according to the first and second aspects of the invention.

The CIJ printer 2 of FIG. 1 comprises a print head 5 connected to a manifold 6 of a printer body by an umbilical housing an ink feed line 17, a gutter line 22, a bleed line 32 and a solvent feed line 35. In operation of the printer, ink is drawn from an ink source in the form of ink reservoir 7 and solvent is drawn from a solvent source in the form of solvent reservoir 8. The ink and solvent reservoirs 7 and 8 are topped up from an ink cartridge 9 and a solvent cartridge 10, respectively.

Ink is drawn from the ink reservoir 7 by main feed pump 12, which is a gear pump that pushes the ink through a fine system filter 13, after which the ink flow is divided at junction 14. A first component of the ink flow is directed to print head drop generator 16, through ink feed line 17, via a damper 18, ink feed valve 19 and further filter 20. A pressure transducer 21 located between the ink feed valve 19 and further filter 20 measures the pressure of the ink in the ink feed line 17 to control the main feed pump 12.

The drop generator 16 has a nozzle 23 that forms a jet of ink that is broken into a sequence of drops, some of which have a charge applied, if they are to be printed drops, the remainder of which are collected and returned to the ink reservoir 7 via gutter line 22.

A second component of the ink flow is further divided at junction 15 and directed either through a first jet pump 24 or through a second jet pump 25 before the second component flows are recombined and returned to the ink reservoir 7 via return line 26. A branch 27 is connected to the output of the first jet pump 24 by a viscometer valve 28, which allows a flow of ink to be directed through a viscometer 29 for measuring the viscosity of the ink.

In standby mode, when the drop generator is not jetting, the ink feed valve 19 is closed and all ink circulates through the jet pumps 24 and 25 and back to the ink reservoir 7. In this mode the flow of ink is comparatively high while the pressure is comparatively low.

The main feed pump 12 develops a pressure at the inlets of the drop generator 16 and jet pumps 24 and 25 of around 3 bar, which results in a flow of ink through the drop generator 16 of the order of 5 ml/min and a flow of ink through the jet pumps 24 and 25 of the order of 800 ml/min.

The print head 5 includes a print head valve 30, which, as described in greater detail below, allows both ink and solvent to enter the drop generator 16.

Solvent is drawn from the solvent reservoir 8 either by vacuum drawn by first jet pump 24 or by vacuum drawn by second jet pump 25. First jet pump 24 draws a vacuum in bleed line 32, which, in turn, is connected to the interior of the drop generator 16 at bleed line junction 31. Bleed valve 33 is mounted in the bleed line 32.

Solvent is directed to the drop generator along solvent feed line 35, the solvent feed line 35 and the ink feed line 17 forming a junction 36 inside the print head 5. A flush valve 37 is included in the solvent feed line 35, which further includes an anti-mixing loop 38 of the type described in WO 2020/025914, the anti-mixing loop 38 preventing any flow of ink due to gravity beyond the anti-mixing loop 38. The printer 2 includes two further valves, namely a wash valve 40 and a makeup valve 41. The wash valve 40, when open, connects the ink feed line 17, between the pressure transducer 21 and the further filter 20, to the bleed line 32 between the bleed valve 33 and the junction 36. The makeup valve 41, when open, connects the solvent reservoir 8 to the gutter line 22, such that solvent is drawn from the solvent reservoir 8 into the second jet pump 25.

During printing, the ink feed valve 19 and printhead valve 30 are open allowing ink under pressure to be delivered to the drop generator 16. It will be appreciated that, during printing, wash valve 40, flush valve 37 and bleed valve 33 are closed. Makeup valve 41 is typically closed during printing unless solvent is being added to the ink in the reservoir 7 to reduce the viscosity of the ink.

Referring to FIG. 2, the first column of the table contains the step numbers referred to in the following description of a shutdown sequence of the printer 2. The second, third, fourth, fifth and sixth columns give the states of the ink feed valve 19, print head valve 30, wash valve 40, bleed valve 33 and flush valve 37, respectively, for each step of the shutdown sequence, "1" indicating an open valve state and "0" indicating a closed valve state.

At step 1, therefore, the printer is still printing and the ink feed valve 19 and print head valve 30 are open and the wash valve 40, bleed valve 33 and flush valve 37 are closed.

At step 2, the shutdown sequence has started. The ink feed valve 19 and print head valve 30 are closed and bleed valve 33 is open. This interrupts the ink jet from the nozzle 23 and the vacuum drawn by first jet pump 24 draws some of the ink between the bleed line junction 31 and the nozzle 23 into the bleed line 32.

At step 3 the wash valve 40 and flush valve 37 are opened. The vacuum drawn by the first jet pump 24 acts through the wash valve 40 to draw solvent into the ink feed line 17 from the solvent feed line 35, moving the interface between the ink and the solvent from the solvent feed line 35 into the ink feed line 17, between the junction 36 and the further filter 20.

At step 4, the print head valve 30 is opened and the wash valve 40 is closed. The vacuum in the bleed line 32 draws solvent from the solvent feed line 35 through the junction 36 and print head valve 30 into the drop generator and into the bleed line 32 at the bleed line junction 31. The flow of solvent flushes ink from the print head between the junction 36 and the bleed line junction 31 into the bleed line 32. It is worth noting that moving the interface between the ink and the solvent between the junction 36 and the further filter 20 at step 3 ensures that there can be no contamination of the solvent used to flush the print head at step 4 with ink as the solvent flows through the junction 36, because the ink feed line 17 contains only solvent at the junction 36.

After sufficient time to fill the bleed line 32 with solvent, at step 5 the flush valve 37, print head valve 30 and bleed valve 33 are closed and the ink feed valve 19 and wash valve 40 are opened. Ink flows from ink feed line 17 through wash valve 40 into bleed line 32, forcing solvent to flow through the drop generator from the bleed line junction 31 to the nozzle 23 and out of the nozzle 23, flushing ink from the drop generator between the bleed line junction 31 and the nozzle 23. The ink and solvent jetted from the nozzle 23 enter the gutter and are returned by the gutter line 22 to the ink reservoir 7.

At step 6, before the ink flowing into the bleed line 32 from the ink feed line 17 reaches the bleed line junction 31, the wash valve 40 is closed and the bleed valve 33 is opened. A negative pressure is developed in the bleed line 32 and drop generator 16. The small size of the nozzle 23 prevents a significant amount of air from being drawn into the drop generator by the negative pressure developed in the drop generator.

At step 7, the bleed valve 33 is closed. The negative pressure developed in the bleed line 32 draws solvent from the drop generator between the bleed line junction 31 and the nozzle 23 into the bleed line, leaving the drop generator free of solvent between the bleed line junction 31 and the nozzle 23.

At step 8, the ink feed valve 19 is closed and the print head valve 30, wash valve 40 and bleed valve 33 are opened. The vacuum drawn by first jet pump 24 acts through wash valve 40 and ink feed line 17 to draw solvent from the print head between the bleed line junction 31 and the print head valve 30 along the ink feed line towards the junction 36, leaving the drop generator and ink feed line 17 between the bleed line junction 31 and print head valve 30 free of solvent.

At step 9 the print head valve 30 and wash valve 40 are closed. Emptying the drop generator and ink feed line 17 between the drop generator and the print head valve 30 of solvent prevents solvent from dripping from the nozzle while the printer is shut down. The bleed line 32 contains solvent and air. The bleed valve 33 is repeatedly opened and closed to draw the solvent along the bleed line 32 to the first jet pump 24. It has been found that "pulsing" the bleed valve 33 open and closed in this way is more effective than simply leaving the bleed valve open, possibly because the negative pressure developed in the bleed line 32 when the bleed valve is opened causes the solvent to vaporise, and closing the bleed valve increases the pressure in the bleed line and condenses the solvent vapour between the bleed valve and the print head, so that the condensate is briefly drawn towards the first jet pump 24 when the bleed valve is opened before being vaporised, so that the solvent moves in a series of steps towards the first jet pump 24.

When the printer is restarted, the bleed valve 33 is closed (if not already closed) and the ink feed valve 19 and flush valve 37 are briefly opened. Ink flows from the ink feed line 17 through junction 36 into the solvent feed line 35, displacing the solvent along the solvent feed line away from the junction 36 until the solvent feed line contains ink from the junction 36 to a point between the anti-mixing loop 38 and the flush valve 37. At this point, the flush valve 37 is closed and the print head valve 30 is opened to establish a jet of ink from the nozzle 23 of the drop generator 16.

As previously explained, the purpose of the step of priming the solvent feed line 35 with ink to a point beyond the anti-mixing loop is to prevent any solvent entering the drop generator while the drop generator is generating ink drops.

The ink feed valve 19, bleed valve 33, wash valve 40, flush valve 37, viscometer valve 28 and makeup valve 41 are all solenoid valves. The print head valve 30 is an armature ported 2:2 valve having minimal dead ended volume within the valve that could trap ink within the valve, trapped ink being likely to cause blockage or sticking of the valve.

A key feature of the invention is the use of the single print head valve 30 to deliver both ink and solvent to the drop generator 16, which has advantages both in simplicity and low cost of the ink system.

It will be appreciated that the above description relates only to one embodiment of the invention, and that the invention encompasses other embodiments as defined by the claims.

The invention claimed is:

1. A continuous inkjet (CIJ) printer that has a drop generator, an ink source, an ink feed line configured to deliver ink from the ink source to the drop generator, a solvent source, a solvent feed line configured to deliver solvent from the solvent source to the drop generator, a flush valve operable to control a flow of solvent through the solvent feed line, a source of negative pressure, a wash valve operable to connect the ink feed line to the source of negative pressure, and a controller operable to control the valves, the solvent feed line and the ink feed line forming a junction such that, in use of the printer, ink and solvent meet at an interface, wherein the controller is operable, when carrying out a shutdown sequence of the printer, to control the wash valve and flush valve to cause solvent to be drawn into the ink feed line from the solvent feed line to draw the interface along the ink feed line away from the drop generator.

2. A CIJ printer according to claim 1, wherein the solvent feed line is provided with an anti-mixing loop adjacent to the junction of the solvent feed line and the ink feed line.

3. A CIJ printer according to claim 2, wherein the printer has an ink feed valve operable to control a flow of ink through the ink feed line, and the controller is operable to control the ink feed valve and the flush valve to cause ink to flow into the solvent feed line to displace the interface along the solvent feed line between the anti-mixing loop and the flush valve.

4. A CIJ printer according to claim 3, wherein the controller is operable to so control the ink feed valve and the flush valve when carrying out a startup sequence of the printer.

5. A CIJ printer according to claim 1, wherein the CIJ printer includes a print head valve operable to control a flow of ink from the ink feed line into the drop generator.

6. A CIJ printer according to claim 5, wherein the print head valve is connected to the ink feed line between the connection to the wash valve and the drop generator.

7. A continuous inkjet (CIJ) printer that has a drop generator, an ink source, an ink feed line configured to deliver ink from the ink source to the drop generator, an ink feed valve operable to control a flow of ink through the ink feed line, a negative pressure source, a bleed line configured to deliver ink and/or solvent from the drop generator to the negative pressure source, and a wash valve operable to connect the ink feed line and the bleed line, wherein the wash valve is connected to the ink feed line between the ink feed valve and the drop generator.

8. A CIJ printer according to claim 7, wherein the CIJ printer includes a print head valve operable to control a flow of ink from the ink feed line into the drop generator.

9. A CIJ printer according to claim 8, wherein the print head valve is connected to the ink feed line between the connection to the wash valve and the drop generator.

10. A CIJ printer according to claim 7, wherein the CIJ printer further comprises a bleed valve operable to control a flow of ink and/or solvent in the bleed line and a controller operable to control the bleed valve and to repeatedly open and close the bleed valve when at least one of solvent and ink is present in the bleed line.

11. A method of controlling the operation of a continuous inkjet (CIJ) printer that has a drop generator, an ink source, an ink feed line configured to deliver ink from the ink source to the drop generator, a solvent source, a solvent feed line configured to deliver solvent from the solvent source to the drop generator, a flush valve operable to control a flow of solvent through the solvent feed line, a source of negative pressure, and a wash valve operable to connect the ink feed line to the source of negative pressure, the solvent feed line and the ink feed line forming a junction such that, in use of the printer, ink and solvent meet at an interface, the method comprising, when carrying out a shutdown sequence of the printer, opening the wash valve and flush valve to cause solvent to be drawn into the ink feed line from the solvent feed line to draw the interface along the ink feed line away from the drop generator.

12. A method according to claim 11, wherein the solvent feed line is provided with an anti-mixing loop adjacent to the junction of the solvent feed line and the ink feed line, the ink feed line is provided with an ink feed valve operable to control a flow of ink through the ink feed line and the method further comprises controlling the ink feed valve and the flush valve to cause ink to flow into the solvent feed line to displace the interface along the solvent feed line between the anti-mixing loop and the flush valve.

13. A method according to claim 11, wherein the CIJ printer has an ink feed valve operable to control a flow of ink through the ink feed line, and a bleed line configured to deliver ink and/or solvent from the drop generator to the source of negative pressure, wherein the wash valve is connected to the ink feed line between the ink feed valve and the drop generator and the wash valve is operable to connect the ink feed line and the bleed line, the method comprising opening the wash valve to cause ink and/or solvent to be drawn from the drop generator into the ink feed line.

14. A method according to claim 13, wherein the CIJ printer includes a bleed valve operable to control a flow of ink and/or solvent in the bleed line and the method further comprises repeatedly opening and closing the bleed valve when at least one of solvent and ink is present in the bleed line.

15. A method according to claim 11, wherein the CIJ printer includes a print head valve operable to control a flow of ink from the ink feed line into the drop generator and the method further comprises opening the print head valve to cause ink to be drawn from the drop generator and that portion of the ink feed line between the print head valve and the wash valve.

* * * * *